United States Patent [19]

Holl et al.

[11] 4,175,671

[45] Nov. 27, 1979

[54] BREATHER CAP

[75] Inventors: Harold H. Holl, Oswego; Walter R. Hupe, Champaign, both of Ill.

[73] Assignee: Caterpillar Tractor Co., Peoria, Ill.

[21] Appl. No.: 901,408

[22] Filed: May 1, 1978

[51] Int. Cl.² ...................... B65D 53/00; B65D 51/16
[52] U.S. Cl. ................................... 220/235; 220/367; 220/371
[58] Field of Search ............... 220/235, 234, 238, 366, 220/367, 371

[56] References Cited

U.S. PATENT DOCUMENTS

| | | | |
|---|---|---|---|
| 3,255,743 | 6/1966 | Kolbe et al. | 220/371 X |
| 3,295,712 | 1/1967 | Peterson | 220/235 |
| 3,326,404 | 6/1967 | Gardner | 220/235 |
| 3,420,274 | 1/1969 | Buttery et al. | 220/235 X |
| 3,891,114 | 6/1975 | Gerdes | 220/367 X |
| 3,901,167 | 8/1975 | Reese | 220/235 X |

Primary Examiner—Steven M. Pollard
Attorney, Agent, or Firm—John W. Grant

[57] ABSTRACT

A breather cap has a resilient element which is expanded radially by the movement of first and second plates toward one another. Air can pass through the breather cap and is filtered by a filter device provided in the breather cap.

2 Claims, 2 Drawing Figures

BREATHER CAP

BACKGROUND OF THE INVENTION

This invention relates to a breather cap for closing an unthreaded spout or filler tube.

Hydraulic reservoirs, transmission cases and the like normally have a filler tube or spout for adding oil or other liquids thereto. The filler spout is normally closed by either a vented or nonvented closure cap. In some uses, hydraulic reservoirs, transmission cases, etc. must be vented to ambient to prevent buildup of pressure or the formation of a vacuum therein due to, for example, expansion and contraction of the liquid in response to temperature changes of the liquid, or due to an increase or decrease in the volume of liquid in response to retraction and/or extension of a hydraulic jack. Thus, when a nonvented cap is used, a separate breather must be provided thereby increasing the manufacturing cost, and in some cases the breathers are prone to permit excessive leakage of the liquid. Although the vent caps heretofore available are less prone to leakage, they have required additional machining steps such as threads on both the filler tube and closure cap.

SUMMARY OF THE INVENTION

The present invention is directed to overcoming one or more of the problems as set forth above.

According to the present invention, a breather cap has first and second plates positioned at opposite ends of a resilient cylindrical element. A means is provided for selectively moving the plates toward one another and radially expanding the resilient element. A first means passes air through the breather cap and a second means filters the air passing through the first means.

DETAILED DESCRIPTION

Figure 1:
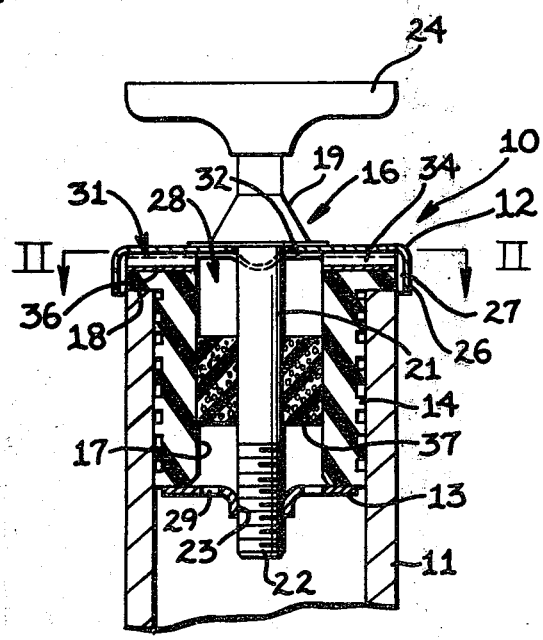
FIG. 1 is a diagrammatic sectional view through a breather cap of the present invention.
Figure 2:
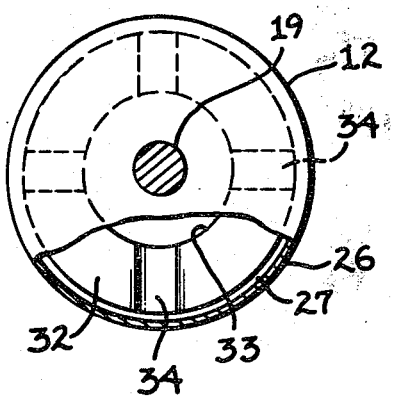
FIG. 2 is a sectional view taken along line II—II of FIG. 1.

Referring now to the drawing, a breather cap is generally indicated by the reference numeral 10, and is shown connected to a filler tube 11. The cap includes first and second plates 12,13 positioned at opposite ends of a resilient cylindrical element 14 and a means 16 for selectively moving the plates toward one another and radially expanding the resilient element into sealing engagement with the inside of the filler tube 11. The resilient element has a central bore 17 extending axially therethrough and an annular flange 18 extending radially outwardly at one end thereof. The resilient element can be constructed from any suitable elastomer such as rubber.

The means 16 can be, for example, a threaded actuator 19 which has an elongated shank 21 extending through a central opening in the first plate and a threaded portion 22 extending through a threaded central bore 23 in the second plate. Thus, rotating a handle 24 of the actuator 19 in one direction causes the threaded portion to rotate in the threaded bore, thereby moving the plates toward one another. This causes the resilient element 14 to bulge or expand radially outwardly into sealing engagement with the inner surface of the filler tube 11. Preferably the length of the threaded portion 22 is selected to limit compression of the resilient element.

The first plate 12 has an annular lip 26 extending longitudinally toward the second plate 13 and encircles the flange 18. The lip is spaced a predetermined distance from the flange 18 thereby forming an annular opening 27.

The above described basic elements are all well known in the art.

A first means 28 passes air through the breather cap 10 between the inside of the filler tube 11 and ambient. The first means can be, for example, the bore 17, a pair of orifices 29 extending through the second plate communicating the inside of the filler tube with the bore 17, and vent means 31 positioned between the first plate 12 and the flange 18 of the resilient element 14 for communicating the bore with ambient.

The vent means 31 can be, for example, a disc 32 positioned between first plate 12 and flange 18 of resilient element 14, a central opening 33 in the disc in communication with bore 17, and a plurality of grooves 34 in the disc facing the first plate and connecting the central opening 33 with ambient through the annular opening 27. The grooves 34 are formed as indented portions 36 in the disc with the indented portions being imbedded within the flange 18 of the resilient elements.

A second means, for example, a filter material 37 such as an open cell urethane positioned within the bore 17, filters the air passing through the first means 16.

In use, air passing from ambient into the filler tube 11 passes through the annular opening 27, grooves 34, central opening 33, bore 17, filter material 37, and orifices 29. The filter material filters foreign material from the air to prevent contamination of the liquid within the tank to which the filler tube is connected. Air can also pass from the interior of the filler tube to ambient in the reverse direction. Since normally the only liquid coming in contact with the breather cap 10 is that caused by sloshing of the liquid in the tank, the orifices and filter material prevent the liquid from passing through the breather cap.

In view of the foregoing, it is readily apparent that the structure of the present invention provides an improved breather cap for closing a filler tube to retain a liquid within a tank while permitting the ingress and egress of air into the tank in response to changes in the volume of liquid within the tank. The breather cap can be sealingly connected to an unthreaded filler tube and not require any special machining on the filler tube for sealing thereagainst.

Other aspects, objects, and advantages of this invention can be obtained from a study of the drawings, the disclosure and the appended claims.

The embodiments of the invention in which an exclusive property or privilege is claimed are defined as follows:

1. In a breather cap having first and second plates positioned at opposite ends of a resilient cylindrical element and means for selectively moving the plates toward one another and radially expanding the resilient element, the improvement comprising:

first means for passing air through the breather cap, said first means including a bore extending longitudinally through said resilient element, an orifice extending through said second plate and in communication with said bore, a disc positioned between said first plate and said resilient element, said disc having a central opening in communication with the bore of said resilient element and a groove in the disc connecting the central opening with ambient;

second means for filtering the air passing through the first means; and wherein said resilient element has a flange extending radially outwardly at the end adjacent the first plate, said first plate having a lip extending longitudinally toward said second plate encircling the flange of the resilient element and spaced therefrom a predetermined distance forming an annular opening, said groove being in communication with said annular opening.

2. The breather cap of claim 1 wherein said groove in said disc is an indented portion of said disc, said indented portion being imbedded within said resilient element.

* * * * *